United States Patent [19]

L'Host et al.

[11] Patent Number: 5,096,138

[45] Date of Patent: Mar. 17, 1992

[54] FISHING REEL WITH A DEVICE FOR SETTING THE BRAKING FORCE

[76] Inventors: Pierre L'Host, Le Martelet, Chatillon sur Cluses; Jean Ruin, En Bud Thyez, both of 74300 Cluses; Joseph Zanon, Le Pré du Cret, Marignier, 74130 Bonneville, all of France

[21] Appl. No.: 389,879

[22] Filed: Aug. 4, 1989
(Under 37 CFR 1.47)

[30] Foreign Application Priority Data

Aug. 5, 1988 [FR] France ................. 88 10772

[51] Int. Cl.$^5$ .............................................. A01K 89/027
[52] U.S. Cl. ................................... 242/245; 116/278; 116/322
[58] Field of Search ............... 242/223, 244, 245, 246, 242/285; 116/243, 278, 322

[56] References Cited

U.S. PATENT DOCUMENTS

| Re. 30,062 | 8/1979 | Valdettaro | 116/243 |
| 2,370,576 | 2/1945 | Petersen | 116/243 |
| 3,512,499 | 5/1970 | Runde et al. | 116/278 |
| 4,391,419 | 7/1983 | Iwama et al. | 242/245 |
| 4,807,828 | 2/1989 | Yamaguchi | 242/223 |

FOREIGN PATENT DOCUMENTS 0355074 2/1990 European Pat. Off. ............ 242/285

*Primary Examiner*—Katherine Matecki
*Attorney, Agent, or Firm*—Ratner & Prestia

[57] ABSTRACT

A fishing reel is provided with a device for setting the braking force, comprising a mobile support having, on its external face, setting signs visible through a window of the case. The support is driven in movement by the reel brake setting knob, the support and its mechanical connection with the setting knob being such that to each angular position of the setting knob there corresponds unequivocally a single setting sign visible through the window.

2 Claims, 10 Drawing Sheets

FISHING REEL WITH A DEVICE FOR SETTING THE BRAKING FORCE

BACKGROUND OF THE INVENTION

The present invention relates to casting reels for fishing having a device preventing breakage of the line in the case of an excessive tension. This device for preventing breakage of the line in the case of an excessive tension is generally called a spool brake, it causes the line to unwind from the spool where it is wound when the tension exceeds a predetermined value, which is less than the breakage strength of the line. The invention relates more particularly to such reels in which the brake is adjusted by the fisherman acting on a rotary knob, which knob rotates about an axis of the case of the reel.

A very widely used form of this type of reel generally comprises a spool fast with one end of a shaft the other end of which penetrates into the case and is connected for rotation therewith through a friction torque limiter, which is formed by a stack of washers alternately interlocked for rotation either with the shaft or with the case, this stack being pressed by a spring tensioned by a screw connected to the rotary setting knob. The rotation of the knob, communicated to the screw, causes said screw to move in translation with respect to the case, which translational movement modifies the tensioning of the spring thus permitting adjustment of the friction torque.

In present-day reels, the function of adjusting the brake is carried out in two main ways, by using the stiffness characteristics of the spring and the pitch of the thread of the screw of the adjustment knob: in a first possibility, the adjustment takes place over two or three turns of the knob, i.e. the total range of adjustment of the brake corresponds to a rotation of two to three complete revolutions of the knob; in a second possibility, the total adjustment range of the brake corresponds to a single revolution of the setting knob.

When the setting is obtained in a single revolution of the knob, the adjustment force can be readily set by setting the angular position of the knob with respect to the case. For example, peripheral graduations on the knob, coming opposite a fixed mark on the case, are sufficient to set the adjustment of the brake without ambiguity. Thus, a fisherman who wishes to put the brake out of adjustment and then come back to its previous set position may do so reliably since the previous set position was marked without ambiguity.

On the other hand, in reels in which the range of adjustment of the brake takes place over more than one turn of the knob, simple peripheral graduations of the knob facing a fixed mark on the case, are no longer sufficient to set with certainty the adjustment of the knob. In fact, the same peripheral portion of the knob may come opposite the fixed mark on the case for several different brake settings which are distinguished from each other by a whole number of turns of the knob. The setting thus becomes ambiguous and the fisherman is obliged to remember the number of turns he has made from the previous setting, so as to be able to come back to this setting by effecting the same number of turns, the peripheral graduation of the knob only allowing refinement of this setting.

Despite this drawback, formed by the ambiguity of setting, brakes are generally preferred in which the setting is obtained by several revolutions of the knob, providing a longer setting range and a smoother and more progressive increase of the friction torque, so as to obtain a fine setting desired by the majority of fishermen.

The object of the present invention is to provide a new reel structure offering both a wide setting range, i.e. setting obtained by a rotary knob through several revolutions, and position setting without ambiguity. Each braking setting, i.e. each angular position of the setting knob, corresponds to one and only one setting mark, the same setting mark corresponding to only one angular position of the knob.

Thus, the invention provides means for setting the angular position of the reel brake setting knob over an angular range greater than one turn.

The means used in the invention to obtain this unambiguous setting of the brake adjustment position are further particularly adapted to the usual reel structure, do not upset the habits of fishermen, comply with ergonomic requirements, do not cause troublesome overdimensioning of the rotary control knob, and do not disturb the usual functions of the reel.

SUMMARY OF THE INVENTION

To attain these objects as well as others, the fishing reel of the invention comprises in a way known per se the traditional reel elements, namely:
a main case,
a brake controlled by a rotary brake knob journalled in the case,
means for setting the angular position of the rotary brake knob,
the total adjustment range of the brake requiring a range of rotation of the rotary brake knob whose amplitude is greater than one turn.

In accordance with the invention, the means for setting the angular position of the rotary brake knob comprise support means and a monotonic ordered succession of setting signs disposed on the support means, the setting means comprise at least one mobile part, separate from the knob, driven mechanically by said knob in its rotational movement with respect to the case for itself moving with respect to the case under the action of the rotation of the knob and showing, during its movement, one of the setting signs of the support in each angular position of the knob; to each setting sign of the support there corresponds a single angular position of the knob and to each angular position of the knob there corresponds a separate and recognizable setting sign of the support.

In a first possibility, said mobile piece is formed by the support itself, which moves under the action of the rotation of the setting knob, and which permanently has at least one setting sign opposite a fixed mark on the case; during rotation of the knob, the setting signs travel past said fixed mark on the case.

In a first variant, the support is a ribbon wound several times about a ribbon-holding socket with a slight radial play. The ribbon-holding socket is mounted for rotation on a cylindrical case portion coaxial with the knob and is rotated by said knob. The ribbon is fixed at both its ends to the ribbon-holding socket and has an intermediate portion sliding between guides of the case opposite a case window. During rotation of the knob, the case window permanently shows an intermediate ribbon turn portion carrying the setting signs and travelling between the case guides which hold the other ribbon turns away from the window.

In another variant, the support is a peripheral ring mounted for rotation on the case coaxially with the knob. The ring is rotated by the knob through a step-down device, so that the total setting range of the knob corresponds at most to a revolution of the ring. An aperture in the case shows a peripheral portion of the ring.

In another variant, the support is a drum guided in axial movement over a case barrel coaxial with the knob, the drum being connected mechanically to the knob by a connection allowing free relative axial translational movement thereof and preventing relative rotation thereof. The axis of the knob defines the axial direction. The drum is connected to the case barrel by a connection producing a relative helical movement of the drum on the barrel when the drum is caused to rotate by rotation of the knob. On its external face the drum has a helical track of setting signs travelling past an aperture in the case.

In another variant, the support is a rotary peripheral plate with radial axis, mounted on the case and comprising a portion of its external surface opposite an aperture of the case showing setting signs. By radial direction is meant a perpendicular to the axis of the knob. The plate is rotated by a mechanical transmission urged by the setting knob. The mechanical transmission allows free axial translation of the setting knob.

According to a second possibility, the support means is a rotary drum coaxial with the knob and locked in rotation with said knob; the drum has, on its cylindrical peripheral surface, a helical track carrying the setting signs and a helical peripheral relief. The mobile piece is, in this embodiment, a slider mounted for sliding longitudinally on guides of the case and comprising a portion in engagement with the helical peripheral relief of the drum, the slider is positioned outside the drum and inside the case, opposite a longitudinal aperture of the case, so that the slider is permanently opposite a portion of the helical track of the drum and said helical track portion is visible through the case aperture.

BRIEF DESCRIPTION OF THE DRAWINGS

Other objects, characteristics and advantages of the present invention will be clear from the following description of particular embodiments, with reference to the accompanying figures in which.

DESCRIPTION OF THE PREFERRED EMBODIMENTS

Figure 4:
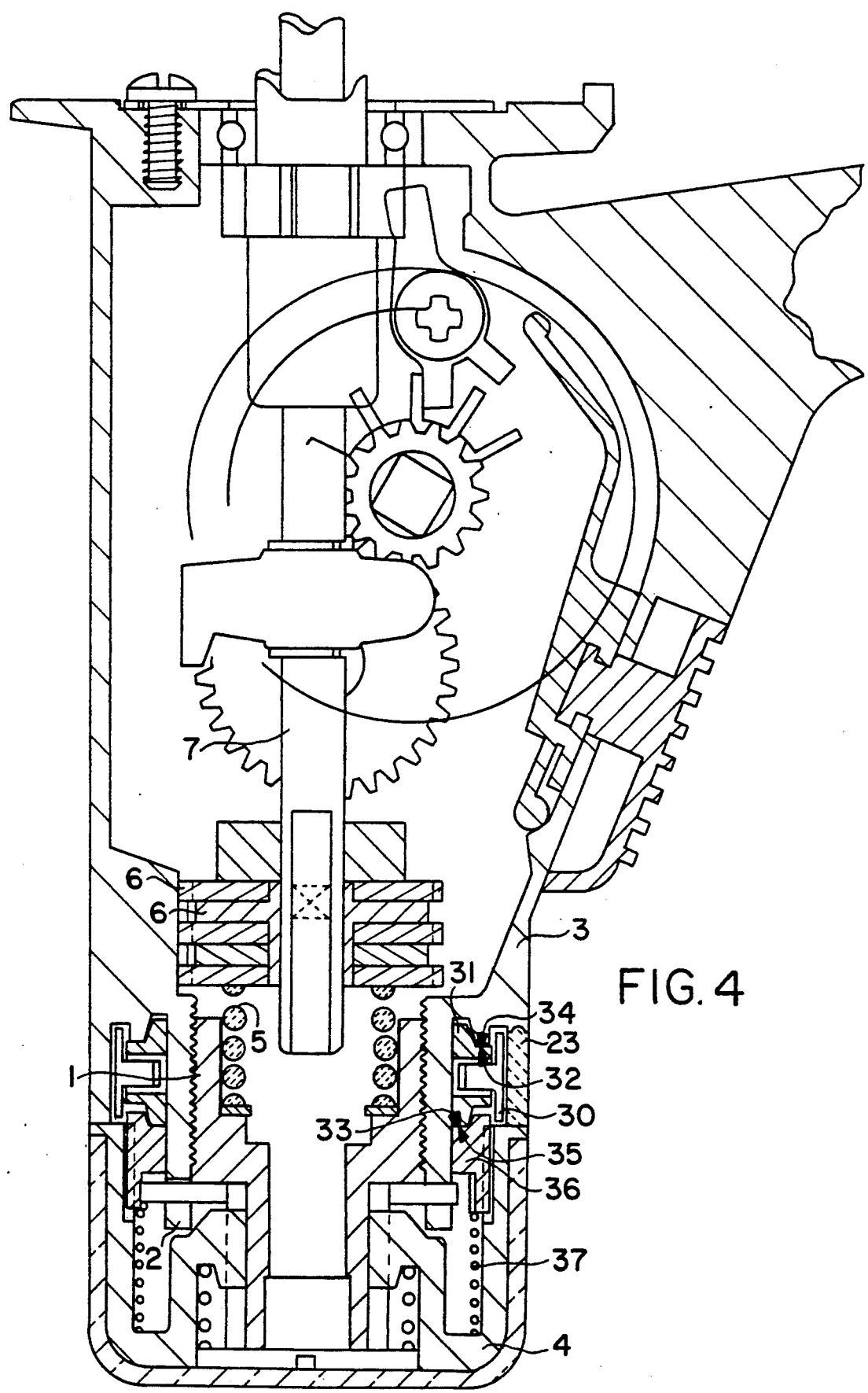
FIG. 4 illustrates a second embodiment, with a peripheral annular support and a planet gear transmission.

In the following description, the fishing reel is assumed to be of conventional construction which comprises a setting screw 1 contained in and screwing into a barrel 2 extending the case 3 of the reel; the brake setting knob 4 is fast for rotation with the setting screw 1, and partially surrounds said barrel 2. Referring for example to FIG. 4, showing more extensively the elements of the reel, rotation of the setting knob 4 causes helical movement of the knob with respect to case 3. The setting knob 4 pushes back a brake spring 5 itself in abutment against a stack of friction washers 6, some washers being fast for rotation with the case, other washers of the stack being fast for rotation with the main longitudinal shaft 7 of the reel. In the embodiment shown, shaft 7 is fast with the spool containing the fishing line. Such a reel is of the fixed drum reel type with rear brake. It will be understood that the invention also applies to other types of reels, to the extent that the reel is controlled by a setting knob through several turns.

To simplify the description, each of the embodiments hereafter will be assumed to be fitted on this same type of fixed drum and rear brake reel. The rotation axis I—I of the setting knob 4 defines the axial direction of the device and by radial direction is meant the perpendiculars intersecting the line I—I.

According to the invention, the means for setting the angular position of the rotary brake knob 4 comprise a monotonic ordered succession of setting signs disposed on support means. To simplify the description, it will be considered that said monotonic ordered succession of setting signs is formed of a succession of consecutive whole numbers in increasing or decreasing order. It should be understood that, without departing from the scope of the invention, other monotonic ordered successions of setting signs may be defined, permitting unambiguous marking of the angular positions. Figures, and colors, letters, or other recognisable signs can for example be associated.

Figure 1:
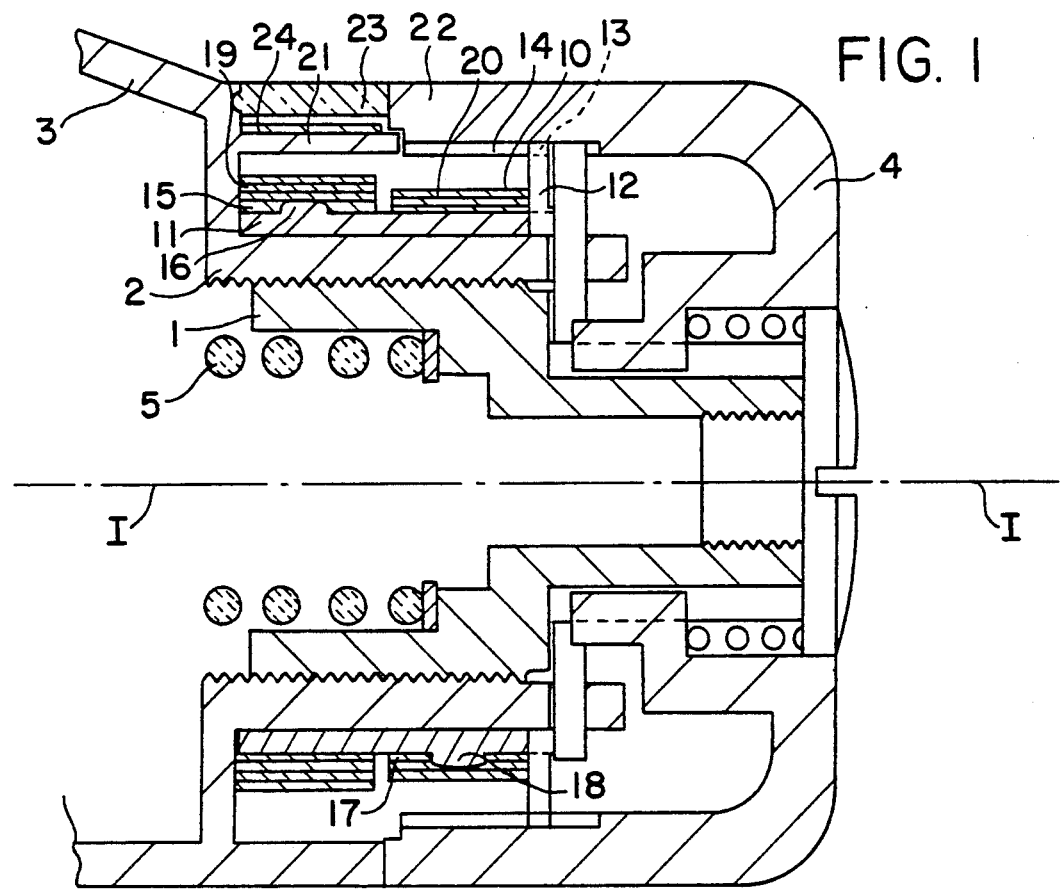
FIGS. 1 to 3 illustrate a first embodiment of the setting device of the invention, comprising a ribbon.
Figure 2:
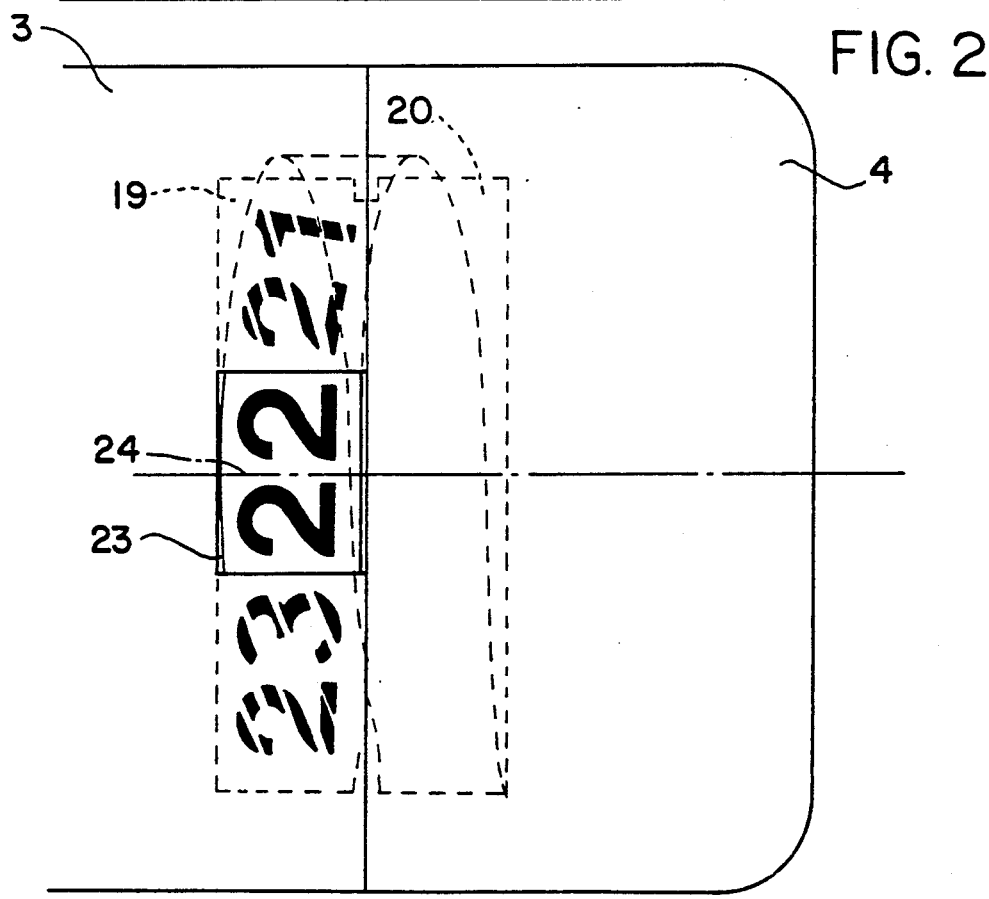
Figure 3:
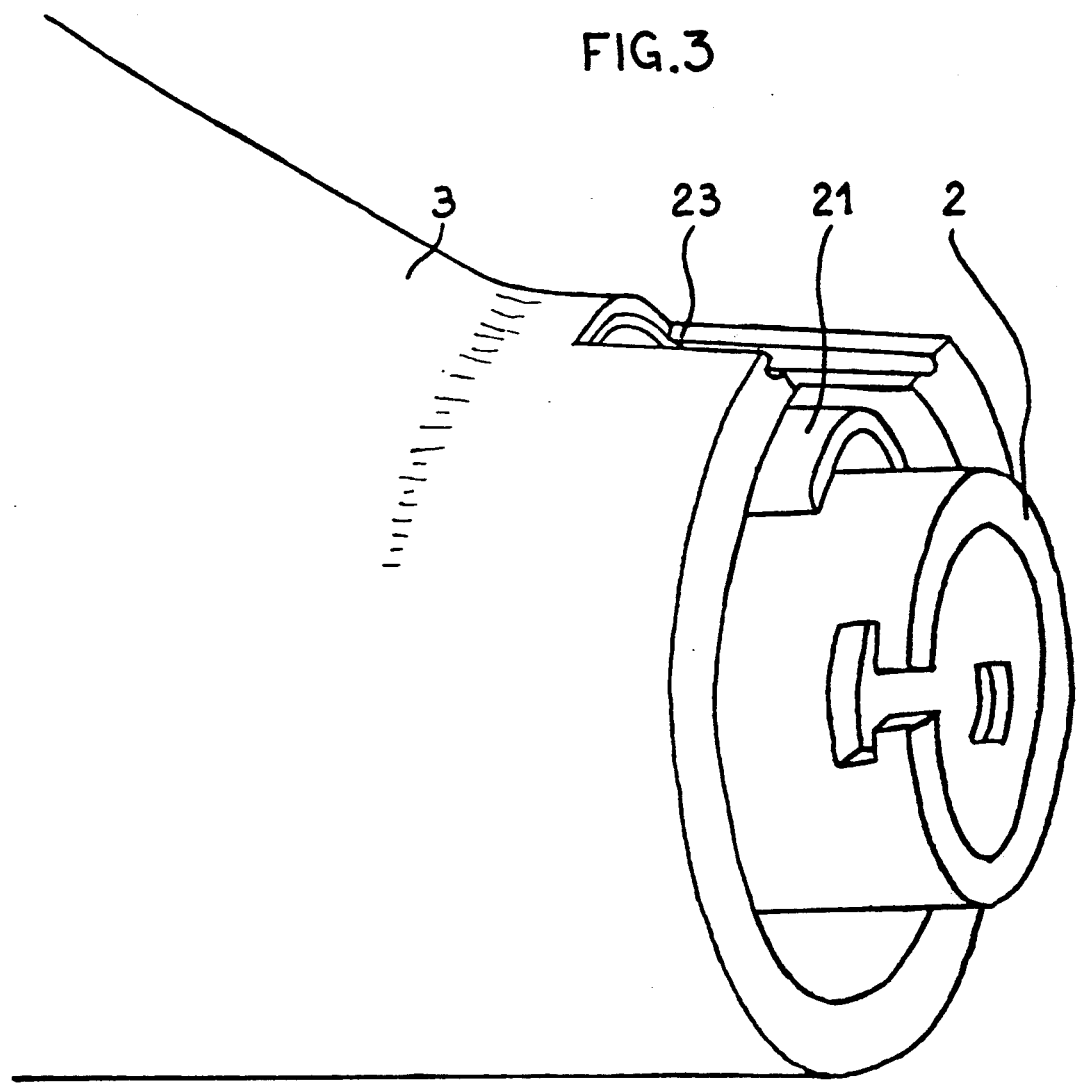

In the embodiment shown in FIGS. 1 to 3, the reel comprises a ribbon 10 wound several times about a ribbon-holding socket 11, the ribbon 10 not being wound too tightly on socket 11 so as to have a slight radial play. The ribbon-holding socket 11 is mounted for rotation on the case barrel 2 which is coaxial with the setting knob 4. The ribbon-holding socket 11 is driven in rotation by the setting knob 4 to which it is joined by a driver 12. The driver 12, fast with socket 11, comprises a toothed periphery 13 whose teeth are engaged in a cylindrical internal toothed portion 14 of knob 4. This connection provides the rotational interconnection of the ribbon-holding socket 11 and knob 4, while allowing free axial translational movement of the socket with respect to the knob.

Ribbon 10 is wound several times about the ribbon-holding socket 11. Its first end 15 is fast with the front portion of the ribbon-holding socket 11, for example by means of a stud 16, whereas its second end 17 is fast with the rear portion of the ribbon-holding socket, for example by means of a stud 18. The turns formed by the adjacent parts of the first ribbon end 15 form a first winding 19, whereas the turns formed by the adjacent parts of the second end 17 of the ribbon form a second winding 20. Between the first winding 19 and the second winding 20, the ribbon is guided axially by guide means fast with case 3. In the embodiment shown, the guide means comprise a case tongue 21, extending in an axial direction, disposed between the external cylindrical wall 22 of the case and the ribbon-holding socket 11. An intermediate portion 24 of ribbon 10 is engaged outside the tongue 21. An aperture or transparent window 23 in the case is formed opposite tongue 21 so that the user may see the external face of the intermediate portion 24 of the ribbon passing over the tongue 21. Thus, in FIGS. 1 to 3, can be seen the intermediate ribbon portion 24, between the first winding 19 and the second winding 20 passing over tongue 21. The setting signs are printed on the external face of ribbon 10 and appear successively in the window or aperture 23 as shown in FIG. 2. The intermediate ribbon portion 24 is held in position on the one hand by tongue 21 and on the other by case 3 itself and by knob 4, as shown in FIG. 1. It will be understood that tongue 21 maintains a constant spacing between the window 23 and the intermediate ribbon portion 24. Other embodiments are however possible, in accordance with the invention, to hold the intermediate ribbon portion 24 in position and guide it. Studs may for example be used fast with case 3, disposed radially in two positions angularly separated about the ribbon. The studs bear against the edges of the ribbon, holding the intermediate ribbon portion 24 opposite the case window 23, while separating the two windings 19 and 20 and maintaining the other ribbon turns away from the window.

During rotation of the setting knob 4, the ribbon turns pass progressively from one of the windings 19 or 20 to the other winding, and the intermediate ribbon portion 24 travels past the case window 23, permanently showing a ribbon portion bearing the setting signs. By providing several turns of ribbon 10 on the ribbon-holding socket 11 it is thus possible to unequivocally set the angular position of setting knob 4 through several revolutions of this setting knob 4.

In the embodiments shown in FIGS. 4 to 7, the reel also comprises a transparent window or aperture 23 showing a portion of an internal support bearing setting signs. In these three embodiments, the setting sign support is a peripheral ring 30 mounted for rotation in case 3 coaxially with the setting knob 4. The peripheral ring 30 is driven in rotation by the knob through a step-down device.

In the embodiment shown in FIG. 4, the step-down device comprises planet gears such as gears 31, spaced apart over the external periphery of ring 30 and each journalled on a radial shaft carried by the ring. Each planet gear may be either a simple cylinder whose axis extends radially, or a set of two cylinders of different diameters connected together, as shown in the figure. Thus, each planet gear comprises a first peripheral toothed track 32, and a second peripheral toothed track 33; the first peripheral toothed track 32 meshes with a front toothed track 34 of the case, the second toothed peripheral track 33 meshing with a toothed front track 35 of an intermediate axial ring 36. The intermediate ring 36 is mounted rotatably and slidably on the axial barrel 2 of the case, and is connected to the setting knob 4 by a mechanical connection allowing the free axial translational movement thereof but preventing its relative rotation. For that, the periphery of the intermediate ring 36 has axial ribs engaging in axial grooves of knob 4. Resilient means 37, such as a helical compression spring, permanently urge the intermediate ring 37 in the direction of the planet gears 31, so as to ensure meshing of the planet gears 31 with the front tracks 34 of the case and 33 of the intermediate ring 36. The peripheral ring 30 has, on its external face, the setting signs visible through the transparent window 23.

When the setting knob 4 is operated, its rotation is transmitted to the intermediate ring 36, which causes the planet gears 31 to rotate, which drive the peripheral ring 30 in a ratio divided by two or more with respect to the setting knob 4. If, for example, the whole of the adjustment of the setting knob 4 takes place over three turns of the knob, a ratio of three will be chosen so that the peripheral ring 30 only makes one turn.

Figure 5:
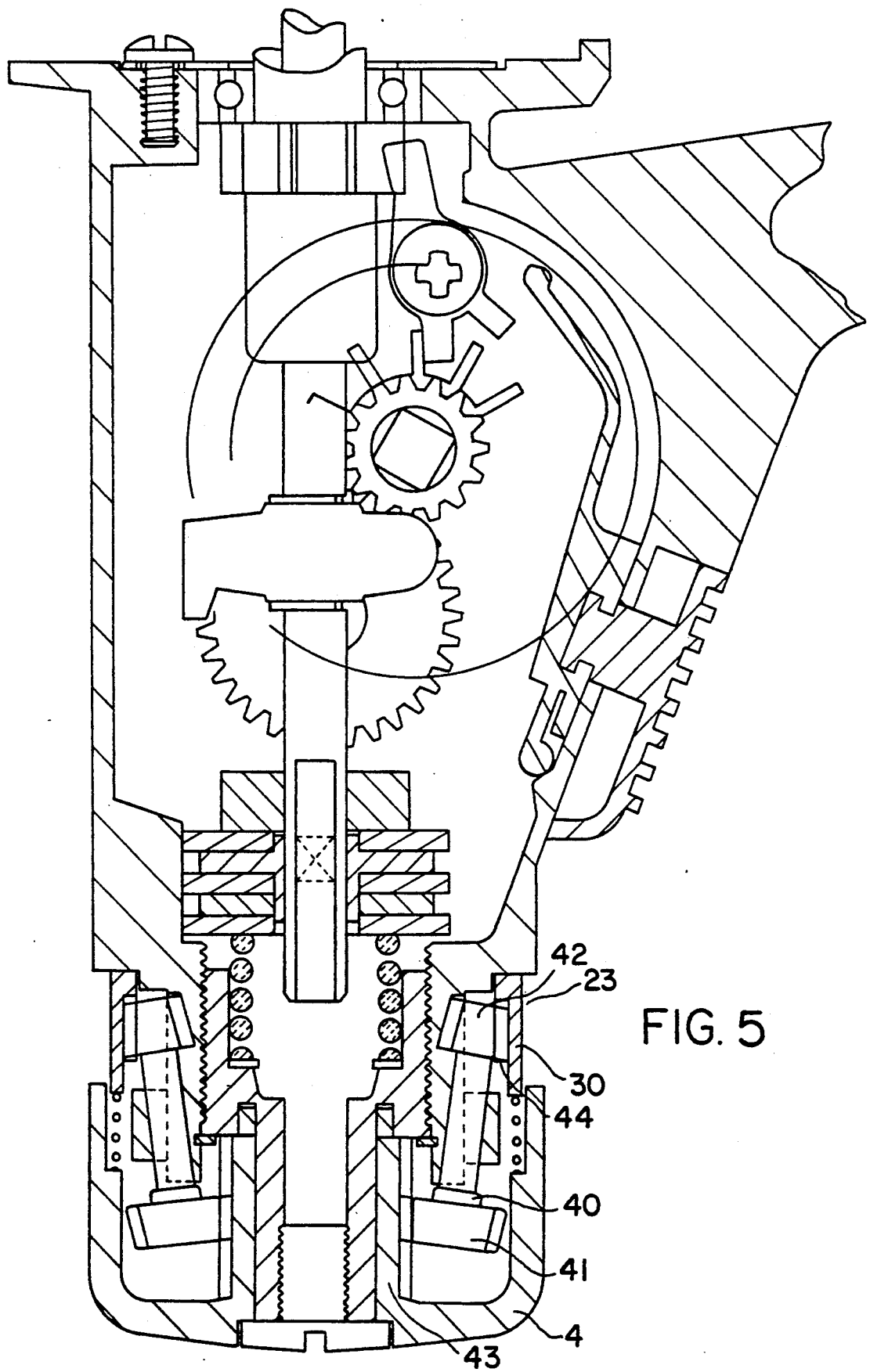
FIG. 5 illustrates an embodiment with a peripheral annular support and intermediate shaft transmission.

In the embodiment shown in FIG. 5, the device stepping down the movement between the peripheral ring 30 and the setting knob 4 comprises at least one transmission shaft 40 journalled in bearings of case 3. Each transmission shaft 40 has a first pinion 41 and a second pinion 42. The first pinion 41 meshes with the external toothed tracked surface of an axial barrel 43 fast with the setting knob 4. The second pinion 42 meshes with the internal toothed tracked surface 44 of ring 30.

Figure 6:
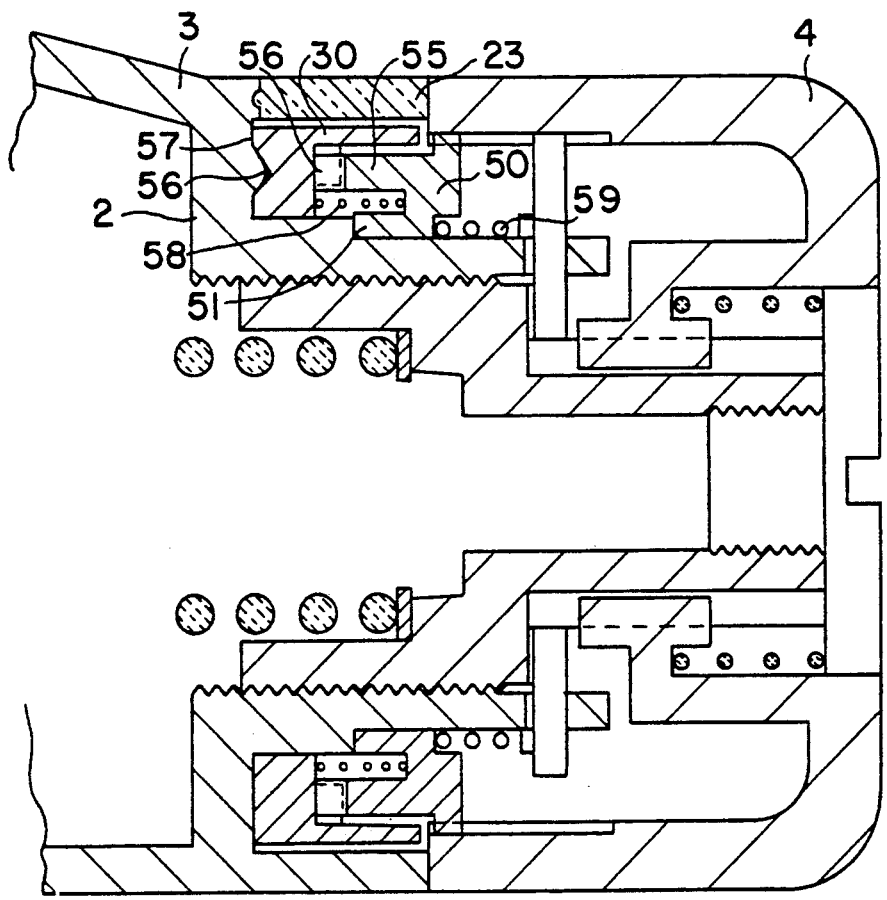
FIGS. 6 and 7 illustrate an embodiment with peripheral annular support and cam and tooth transmission.
Figure 7:
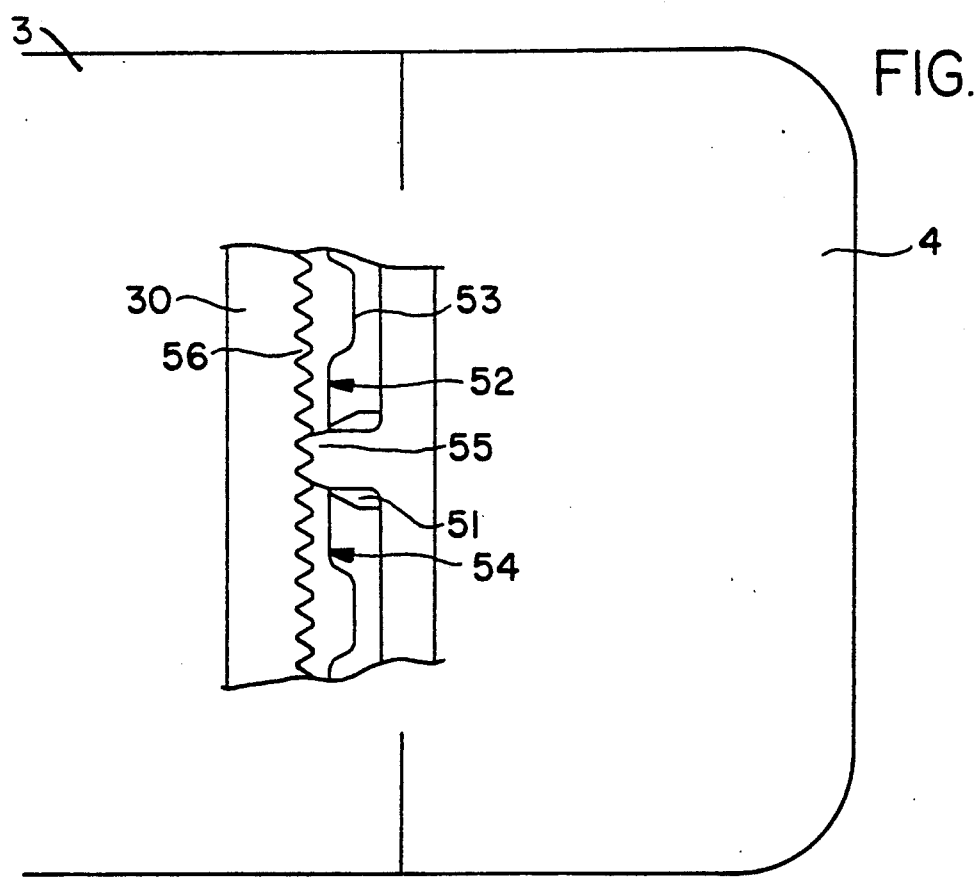

In the embodiment shown in FIGS. 6 and 7, the step-down device between the peripheral ring 30 and the setting knob 4 comprises a claw-carrying ring 50 mounted rotatably and slidingly on the axial barrel 2 of the case. The claw-front carrying ring 50 is connected to the setting knob 4 by a mechanical connection allowing free axial translational movement thereof but preventing its relative rotation. The claw-carrying ring has projecting front portions 51, such as shown for example in FIG. 7, the front projecting portions 51 bearing against a front track 52 of the case forming a cam. The front track 52 of the case comprises projecting portions such as portion 53, and re-entrant portions, such as portion 54, spaced apart over the periphery of track 52. The claw-carrying ring 50 further has front claws 55 for engaging in the teeth of a corresponding front toothed track of the peripheral ring 30. Engagement indexing means are provided for selectively holding the peripheral ring 30 in different chosen angular positions, preferably in each angular position corresponding to the appearance, in window 23, of a setting number printed on the external peripheral surface of ring 30. In the embodiment shown, the indexing means comprise spherical indexing studs 56 spaced apart along the annular front surface 57 of case 3, and cooperating with corresponding housings spaced apart over the front surface of ring 30. First resilient means 58, such as a helical compression spring, urge the peripheral ring 30 against the front surface 57 of the case; second resilient means 59 urge the claw-carrying ring 50 against the peripheral ring 30 for holding its front projecting portions 51 against the cam or front track 52 of the case. The front case track 52 is formed so that, when the projecting portions 51 of the claw-carrying ring are in abutment against the re-entrant track portions 54, claws 55 are engaged in the teeth of the toothed tracked track 56 and, when the projecting portions 51 of the claw-carrying ring are in engagement with projecting cam portions 53, the claws 55 are disengaged from the toothed tracked track 56. The result is that, when the setting knob 4 is rotated, the setting knob 4 permanently drives the claw-carrying ring 50 in rotation, whereas the claw-carrying ring only drives the peripheral ring 30 in rotation in the portions of rotation in which the front part 51 of the claw-carrying ring bears against the re-entrant cam portions 54. In the portions of rotation in which the front parts 51 of the claw-carrying ring bear against the projecting portions 53 of the cam, the indexing means block rotation of the peripheral ring 30, which remains fixed.

Figure 8:
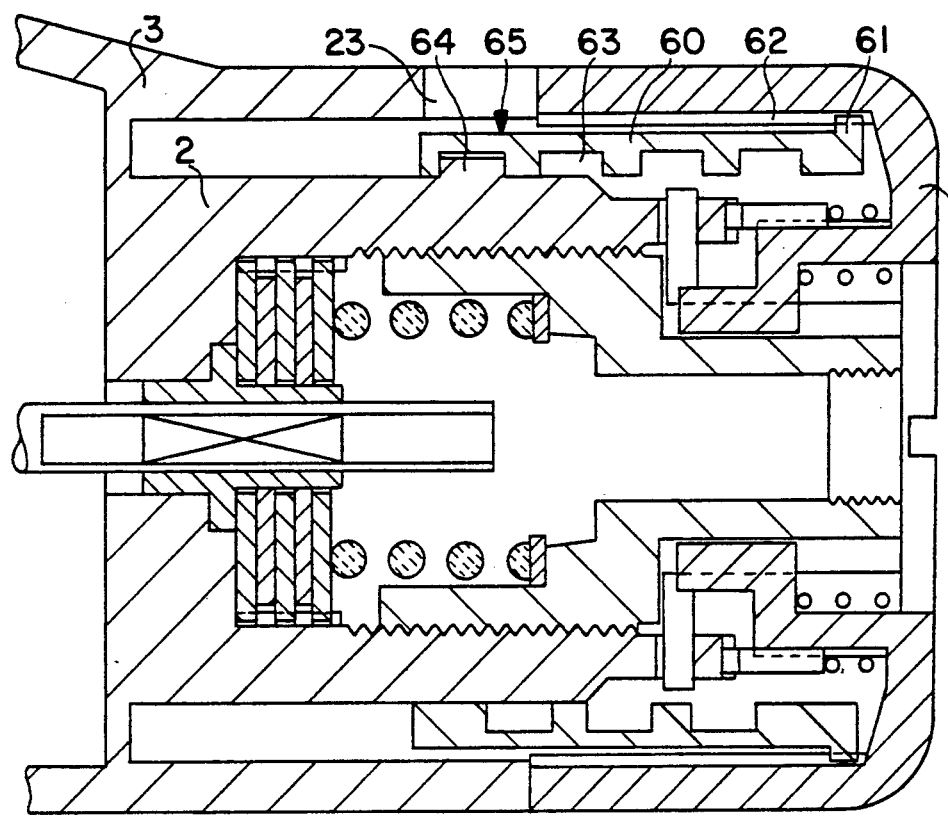
FIGS. 8 and 9 illustrate an embodiment with a support in the form of a drum with helical movement.
Figure 9:
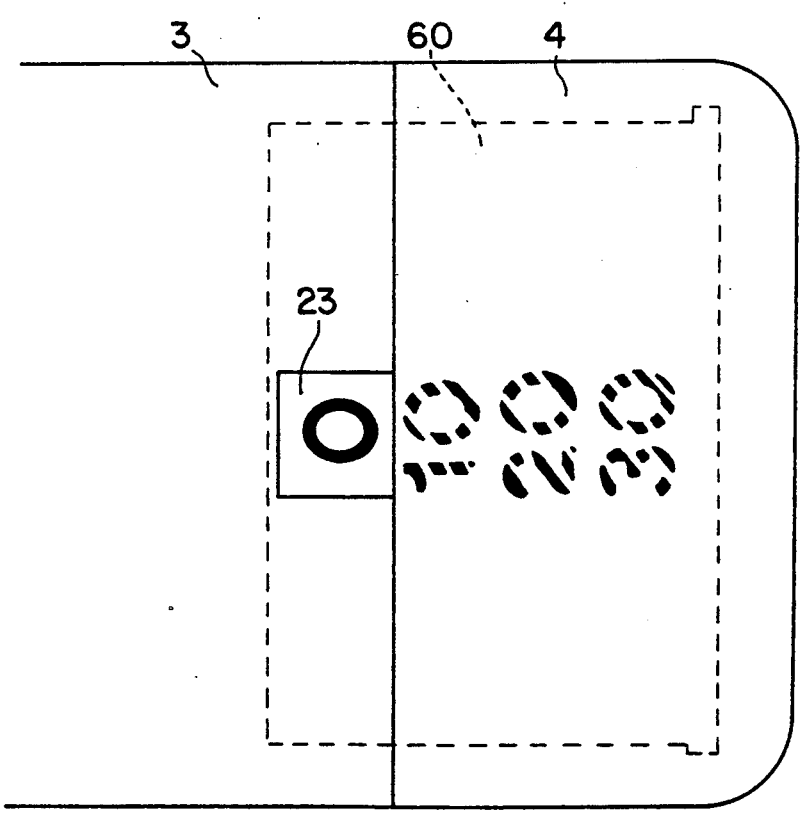

In the embodiment shown in FIGS. 8 and 9, the case 3 also comprises a transparent window 23 through which the user may see setting signs carried by a support. In this embodiment, the support is a drum 60 guided in rotation and in axial movement on the axial barrel 2 of the case. Drum 60 is connected mechanically to the setting knob 4 by a connection allowing its free relative axial translational movement but preventing its relative rotation: peripheral external teeth 61 of the drum 60 are engaged in axial grooves 62 formed in the internal face of the peripheral cylindrical wall of knob 4. Drum 60 is connected to the case barrel 2 by a connection allowing a relative helical movement of the drum on the barrel when the drum is caused to rotate by rotation of knob 4. For that, the drum has, on its internal face, a helical groove 63 in which is engaged a cylindrical radial stud 64 formed on the external face of the case barrel 2. Drum 60 has, on its external peripheral face 65, a helical track of setting signs, the helical track of setting signs having the same pitch as the helical groove 63, and being disposed so that the setting signs travel past the case aperture 23, during the helical movement of drum 60.

Figure 10:
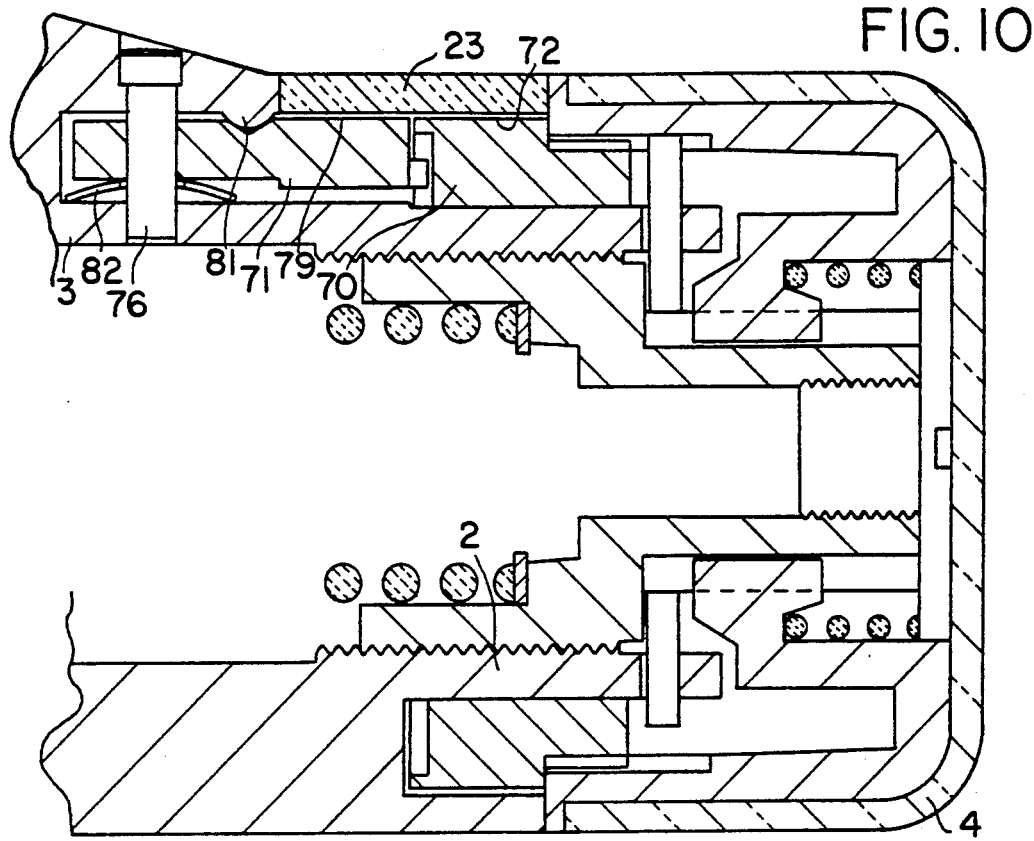
FIGS. 10 and 11 illustrate an embodiment in which the support comprises a rotary annular element coaxial with the knob and a rotary plate with radial axis.
Figure 11:
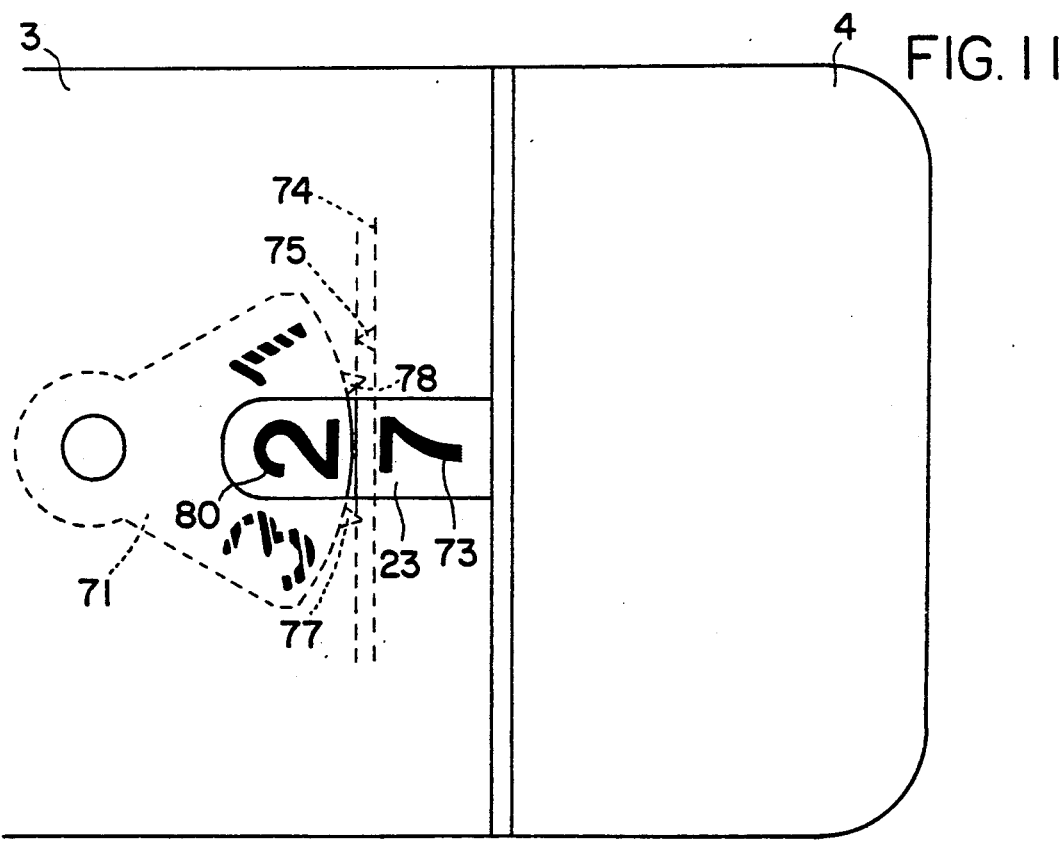

In the embodiment shown in FIGS. 10 and 11, case 3 also comprises a side window or aperture 23 through which the user may see the setting signs on the internal support. In this embodiment, the setting sign support comprises two separate elements, namely a peripheral ring 70 and a rotary plate 71. The peripheral ring 70 is mounted for rotation on the case coaxially with the knob and rotates freely on the case barrel 2. The ring is driven in rotation by the setting knob 4 through a mechanical connection preventing relative rotation. The peripheral ring 70 has, on its external surface 72, a first track 73 of setting signs travelling past aperture 23 or in front of a first case aperture. The peripheral ring 70 comprises a front surface 74 with a tooth 75.

The rotary plate 71 rotates about a radial pivot 76 fast with case 3. Plate 71 has peripheral teeth such as teeth 77 and 78, spaced apart from each other and cooperating with the tooth 75 of the peripheral ring. The rotary plate 71 has, on its external face 79, a second track 80 of setting signs travelling past aperture 23 or in front of a second case aperture.

When the user rotates the setting knob 4, the knob 4 drives the peripheral ring 70 in rotation. Whenever tooth 75 arrives opposite the peripheral surface of plate 71, it engages with one of the teeth of the plate such as teeth 77 and 78 and drives plate 71 in rotation to increment the plate by an interval between two successive setting signs of the second track 80 of setting signs. Engagement indexing means are also provided for holding the plate 71 in given successive positions. Spherical studs 81 of the case may for example be used engaging in a corresponding housing provided in the external face 79 of plate 71, a resilient means 82 urging plate 71 against stud 81. In use, the first track 73 may comprise figures from 0 to 9, the second track 80 comprising figures 1, 2 and 3 and in the case where the setting knob 4 comprises a variation range of three turns.

Figure 12:
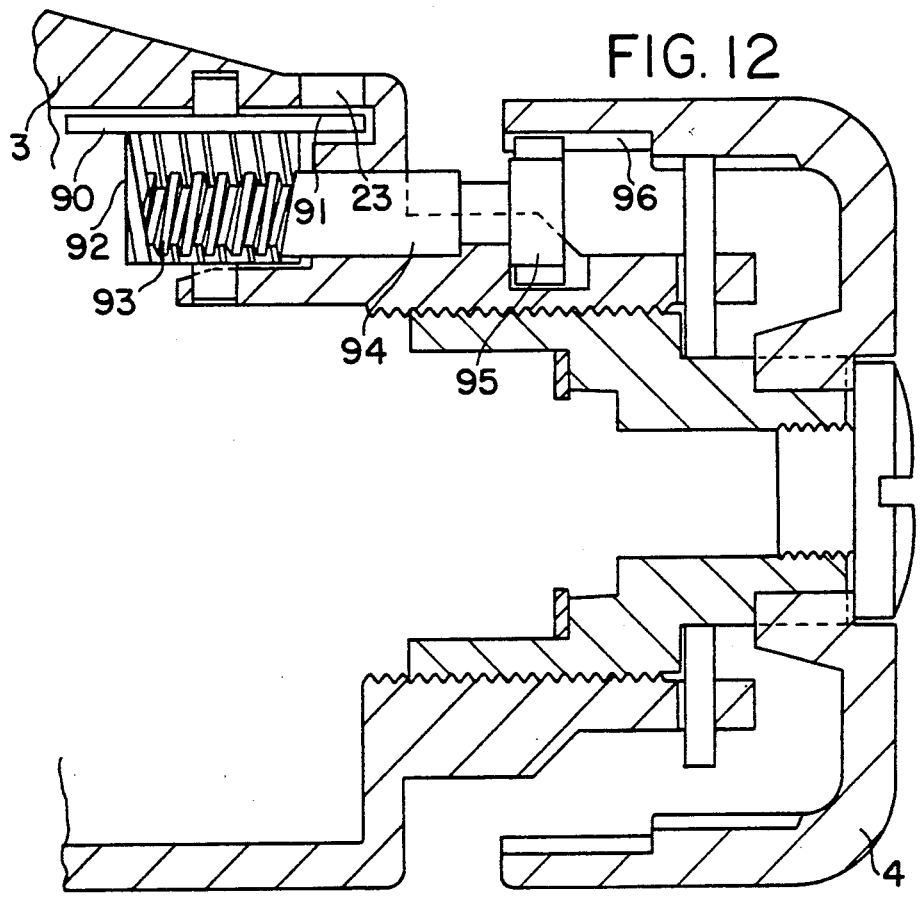
FIGS. 12 and 13 illustrate one embodiment in which the support is a rotary plate with endless screw transmission.
Figure 13:
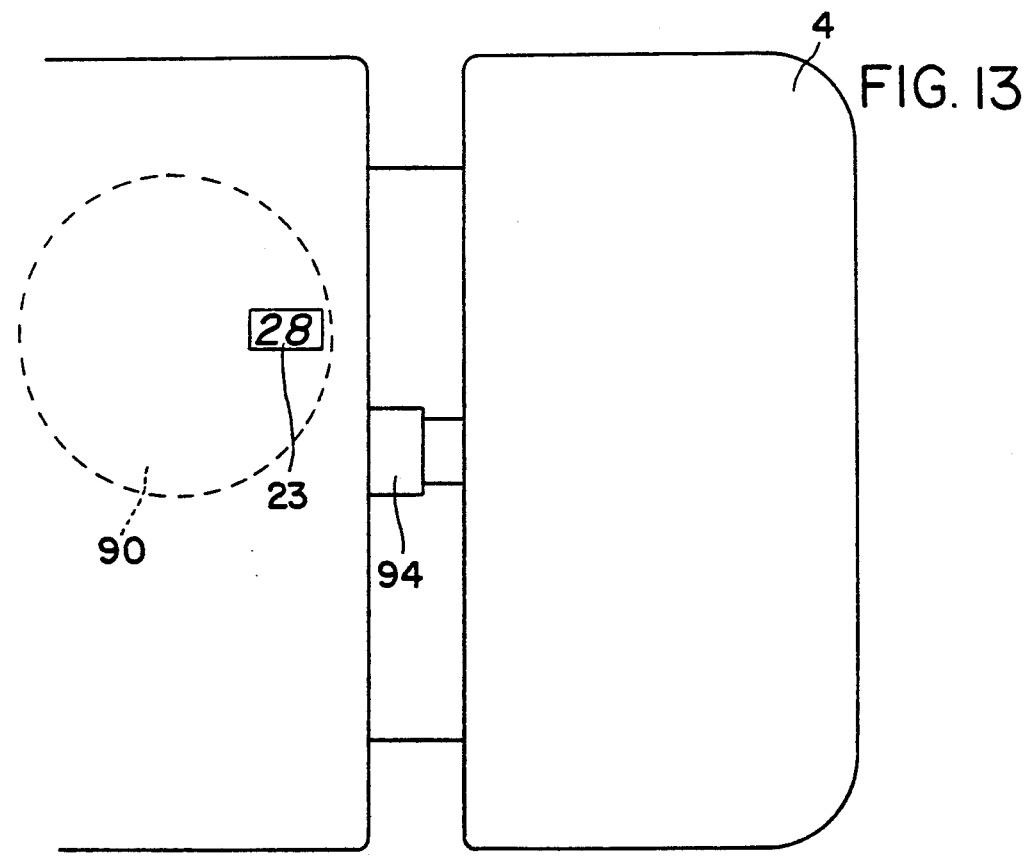

In the embodiment shown in FIGS. 12 and 13, the setting sign support is a rotary peripheral plate 90, with radial axis, mounted on case 3, a portion of its external surface 91 being visible through the case aperture 23, showing the setting signs. The rotary plate 90 comprises a pinion 92 meshing with a screw 93 mounted at the end of a shaft 94. Shaft 94 rotates in bearings of case 3. Shaft 94 carries a pinion 95 meshing with a cylindrical internal axial toothed portion 96 of the setting knob 4, allowing relative translation of the knob and of the shaft while interlocking the two elements for rotation.

Figure 14:
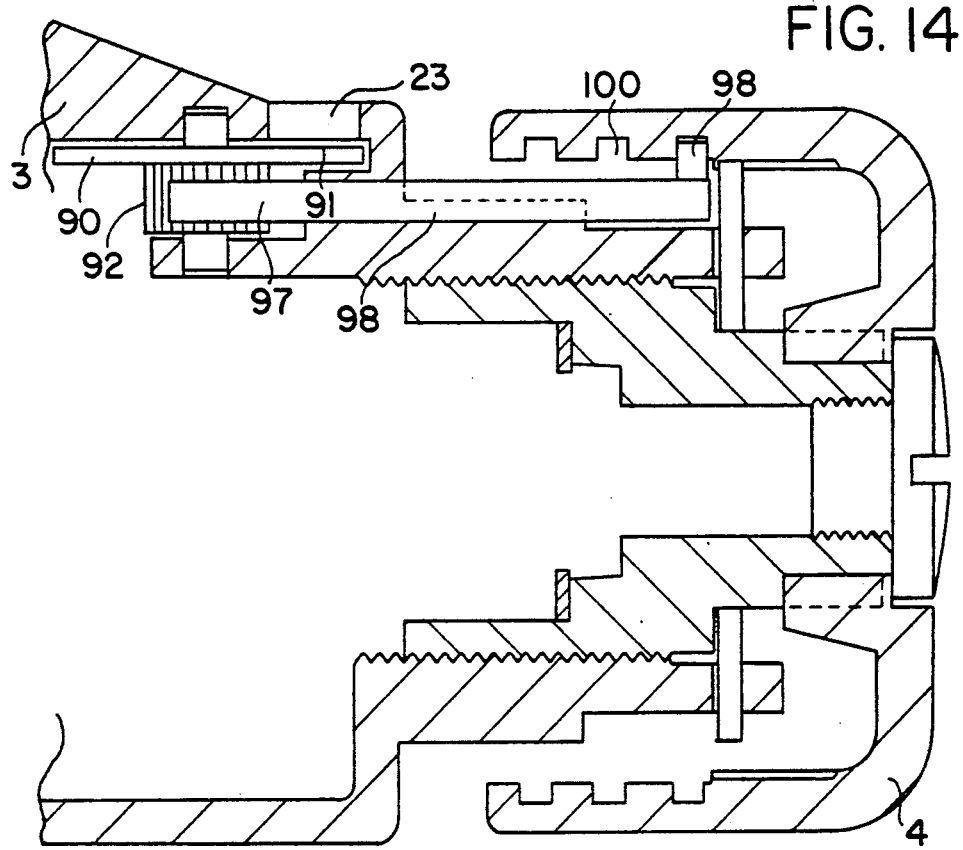
FIGS. 14 and 15 illustrate an embodiment in which the support is a rotary plate with rack transmission.
Figure 15:
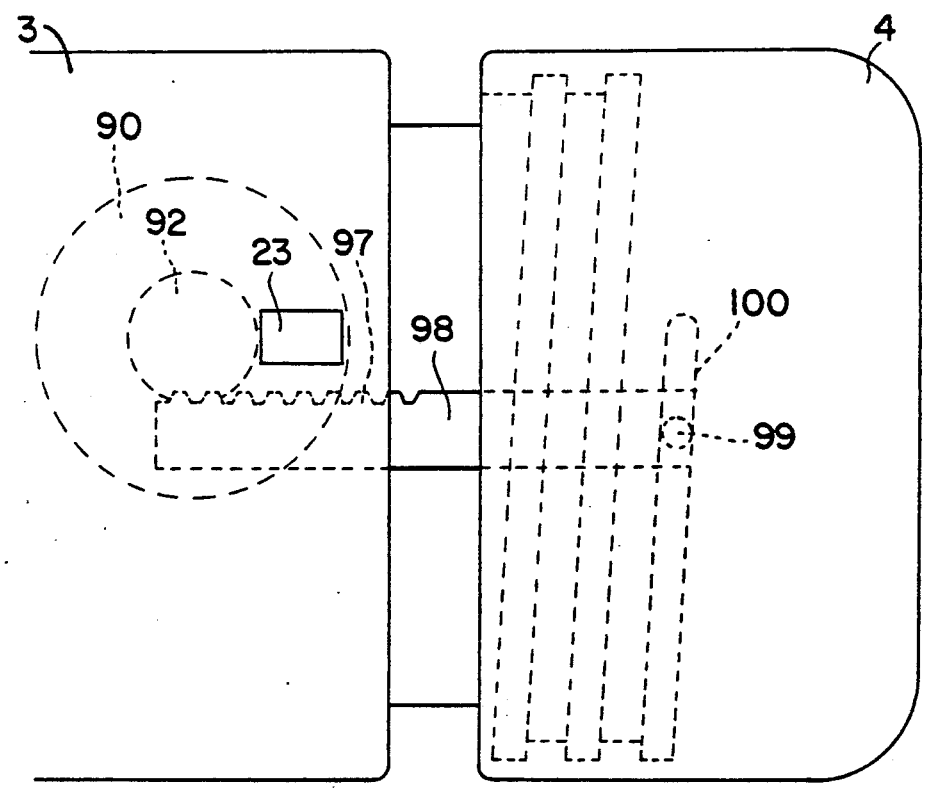

In the embodiment shown in FIGS. 14 and 15, the setting sign support is also a rotary peripheral plate 90 with radial axis, partially visible through the aperture or window 23 of the case, and comprising a drive pinion 92. In this embodiment, the pinion 92 meshes with a rack 97 formed on a rod 98 mounted for axial sliding on guides of the case 3. Rod 98 is connected to knob 4 by a helical type connection causing the axial translational movement of rod 98 under the effect of a rotation of knob 4. For that, the rod comprises a radial arm 99 whose end is engaged in a helical groove 100 formed in the internal face of the cylindrical wall of knob 4.

When the setting knob 4 is rotated, this rotation causes the translational movement of rod 98 which itself causes rotation of the rotary plate 90.

Figure 16:
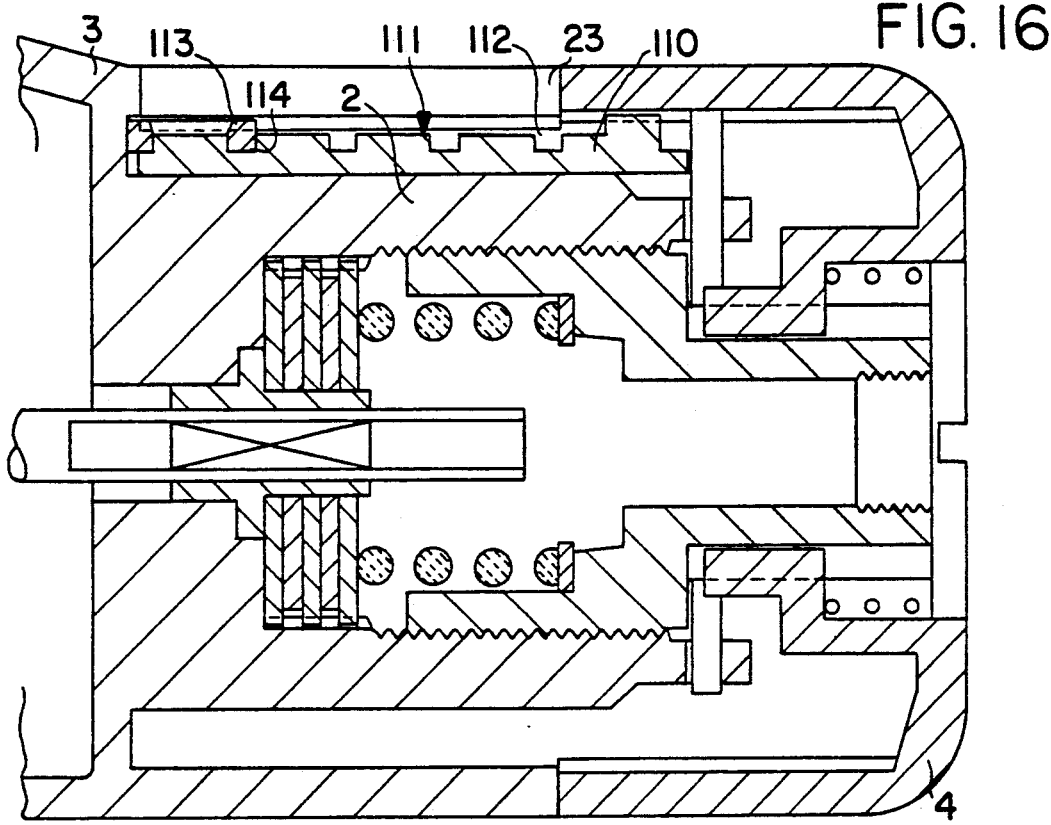
FIGS. 16 and 17 illustrate an embodiment in which the support is a drum with helical movement associated with a window movable in translation.
Figure 17:
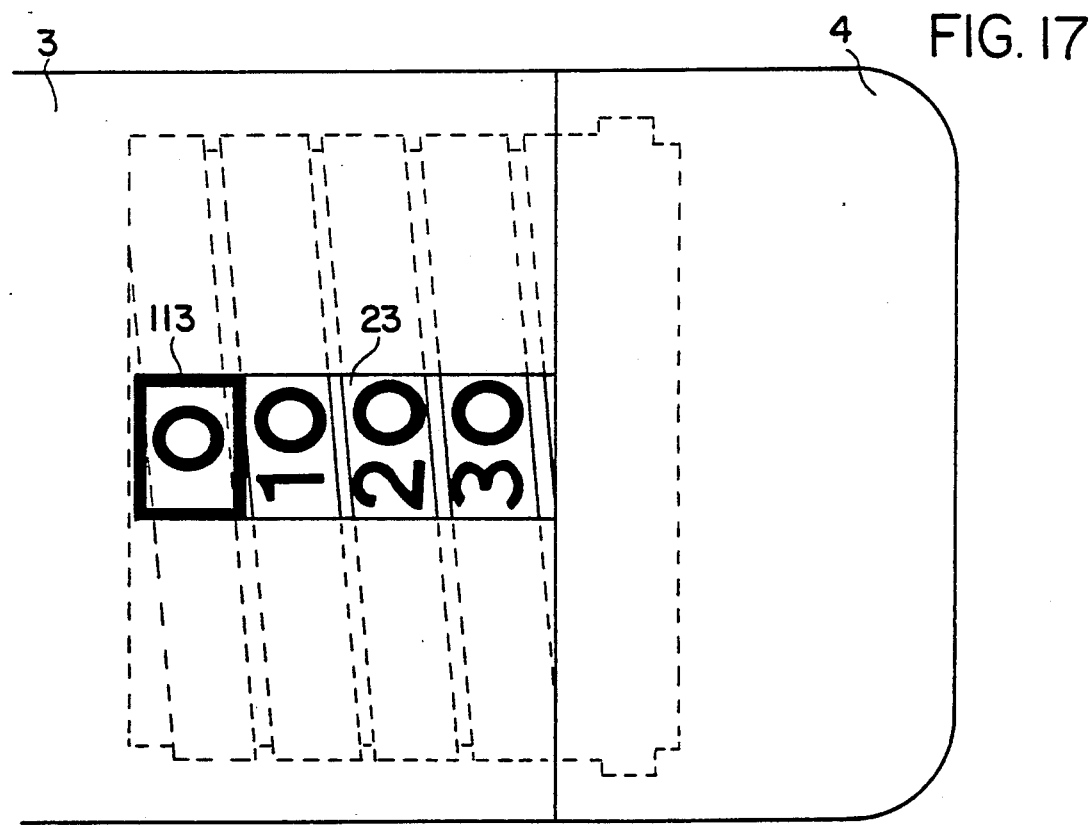

In the embodiment shown in FIGS. 16 and 17, the reel comprises a peripheral aperture or window 23 elongate in the axial direction, as shown in the Figures. In this embodiment, the setting sign support means is a rotary drum 110 coaxial with knob 4 and interlocked for rotation with said knob 4. Drum 110 rotates on the barrel 2 of the case and comprises, on its external cylindrical peripheral face, a helical track 111 carrying the setting signs, and a helical peripheral relief of the same pitch as the helical track bearing the setting signs. For example, the external surface has a helical groove 112 whose interval defines the helical track 111. A slider 113 is mounted for sliding longitudinally on guides of the case and comprises at least one portion 114 in engagement with the helical peripheral relief such as groove 112 of drum 110. Slider 113 is positioned, as shown in the Figures, outside drum 110 and inside the case 3, opposite the longitudinal aperture 23 of the case. When the setting knob 4 is rotated, this rotation causes on the one hand rotation of drum 110 and simultaneously the translational movement of slider 113. At each position of the setting knob 4, drum 110 and slider 113 designate one of the signs disposed on track 111 of drum 110, the sign being visible through the aperture 23 of the case.

In the preceding embodiments, the setting signs carried by the support are visible through window or aperture 23. It will be readily understood that, alternately, another indicator means may be used such for example as an arrow or a mark carried by the case 3.

The present invention is not limited to the embodiments which have been explicitly described, but includes the different variations and generalisations thereof contained within the scope of the following claims.

What is claimed is:

1. A fishing reel, comprising:
   a main case, including a main case window,
   a main longitudinal spool shaft, rotating in the main case,
   a brake member providing a braking torque on the spool shaft in an adjustment range,
   a rotary brake setting knob having a plurality of angular positions and journalled in the main case, controlling the braking torque provided by the brake member, the adjustment range of the brake member including more than one complete rotation of the brake setting knob, the main case having an axial barrel coaxial with the brake setting knob, means for displaying each of said plurality of angular positions of the brake setting knob comprising support means and an ordered succession of setting signs disposed on the support means, the displaying means comprising at least one movable part, separate from the brake setting knob, driven mechanically by the brake setting knob when rotated with respect to the case so as to move the movable part with respect to the case under the action of the rotation of the brake setting knob and show, during movement, each of the succession of setting signs in each of said plurality of angular positions of the setting knob, respectively, each setting sign corresponds to one angular position of said plurality of angular positions of the rotary brake setting knob and to each of said plurality of angular positions of the setting knob there corresponds one of the succession of setting signs of the support means being separate and recognizable, said support means has at least one of the setting signs opposite a fixed mark on the case so that, during rotation of the knob, the succession of setting signs travel past said fixed mark on the case, said support means including a ribbon-holding socket mounted for rotation on the axial barrel and being rotated by said rotary brake setting knob, a ribbon wound several times about the ribbon holding socket and having a slight radial play, the ribbon being fast at both its ends with the ribbon-holding socket and having an intermediate ribbon portion and a plurality of remaining portions, and the main case having guides disposed opposite the main case window, the guides having the intermediate ribbon portion sliding between them and holding the plurality of remaining portions away from the window, so that during rotation of the brake setting knob, the main case window permanently showing the intermediate ribbon portion carrying the setting signs.

2. The reel as claimed in claim 1 wherein the case guides comprise a longitudinal tongue of the case disposed between the window and the ribbon-holding socket, the intermediate portion of the ribbon being passed over the tongue, longitudinal abutment means providing longitudinal fixing of the intermediate ribbon portion on the tongue.

* * * * *